July 28, 1931.  L. McCANDLESS ET AL  1,815,926
LIQUID DISPENSING APPARATUS
Filed April 2, 1928   6 Sheets-Sheet 1

Witness:
R. Burkhardt

Inventors:
Lyon McCandless,
Jack D. Sartakoff,
By Atkinson, Hurley, Byron & Knight
Attys.

July 28, 1931.  L. McCANDLESS ET AL  1,815,926
LIQUID DISPENSING APPARATUS
Filed April 2, 1928  6 Sheets-Sheet 5

Witness:
R. Burkhardt.

Inventors:
Lyon McCandless,
Jack D. Sartghoff,
By Atkinson, Hurley, Byron & Knight
attys.

Patented July 28, 1931

1,815,926

UNITED STATES PATENT OFFICE

LYON McCANDLESS AND JACK D. SARTAKOFF, OF ROCHESTER, PENNSYLVANIA, ASSIGNORS, BY MESNE ASSIGNMENTS, TO THE WAYNE PUMP COMPANY, OF BALTIMORE, MARYLAND, A CORPORATION OF MARYLAND

LIQUID DISPENSING APPARATUS

Application filed April 2, 1928. Serial No. 266,570.

This invention pertains to liquid dispensing apparatus, and more particularly to that form of liquid dispensing apparatus having a plurality of measuring chambers, such as those of the "Supertwin" type employing the visible and progressive method of dispensing liquid.

In some of the pumps now in general use, it is possible to dispense certain progressive and selective amounts of liquid more or less accurately. However, an objection has been raised to these pumps in that operation usually takes place at a plurality of points, making it necessary for the attendant to travel from one point to another to effect filling, measuring, insertion of the hose for delivery, and finally delivery, and as is readily appreciated, this is objectionable in the time lost and the chances of error in setting and resetting the pump for delivery of amounts of liquid. Not only that, but with these pumps great difficulty is encountered in what is known as the "wet hose evil". It is not desirable or safe to have liquid dripping from the nozzle and also under certain regulations when the pump is in inoperative position, as when it is closed for any length of time, the measuring chamber or chambers must be empty, and it is of course desirable and oftentimes imperative that the working parts must be rendered inoperative so that unauthorized operation cannot be effected. With certain forms of the pumps now employing a plurality of measuring chambers, attempt has been made to render discharge continuous by automatic operation of some means for effecting simultaneous filling and discharge to and from the measuring chambers. However, these pumps are very complicated to build and maintain, with a consequent chance of certain of the parts becoming inoperative, thereby putting the entire system out of commission.

It is therefore an object of this invention to provide a simple, reliable and efficient liquid dispensing apparatus in which liquid may be quickly, accurately and continuously measured and dispensed.

Another object is to provide a device which is fool and cheat proof and in which certain of the parts may be so disposed that the device is rendered inoperative under predetermined conditions.

Still another object is to provide a liquid dispensing apparatus in which the means for controlling the supply to and discharge from the measuring chambers is of automatic operation.

Still a further object is to provide an apparatus wherein it is possible to alternately supply to each of a plurality of measuring chambers predetermined amounts of liquid, excess of said amounts being effective for controlling supply to and discharge from said chambers.

A further object is to provide apparatus of the type indicated in which the various parts of the apparatus are timed and controlled to automatically secure accurate measurement of liquid and facilitates the dispensing thereof.

Still another object is to provide a liquid dispensing apparatus which is inexpensive to make, has a minimum of operating parts, is progressive in operation, and fulfills all requirements of manufacture and service.

With these and various other objects in view, the invention consists of certain novel features of construction and operation as will be more fully described and particularly pointed out in the specification, drawings and claims appended hereto.

In the drawings, wherein like reference characters are used to designate like parts—

Referring to the figures of the drawings, it will be noted that the invention is illustrated in connection with liquid dispensing apparatus in which there are two similar or twin cylinders or chambers 20, preferably of glass, in which the liquid to be dispensed is measured, it being understood that as liquid is supplied to one measuring chamber, liquid is discharged from the other for minimizing the time required to supply liquid to the customer. Preferably each of the twin chambers has a certain capacity, say one gallon, said chambers being supported on the usual standard or casing 21 through a base member 22, it being understood that the base member is formed or has secured thereto conduits communicating with each of the measuring chambers, said conduits being connected to the casing of a four-way valve 23. The upper ends of the measuring chambers may be capped and closed with a suitable marker or index supporting head 24, said chambers having communication with each other through a suitable passage adapted to be closed when liquid has been filled in said chambers to a predetermined height, all as disclosed in Patent No. 1,771,747, Delanoy and Deutsch, liquid dispensing apparatus, issued July 29, 1930.

Figure 3:
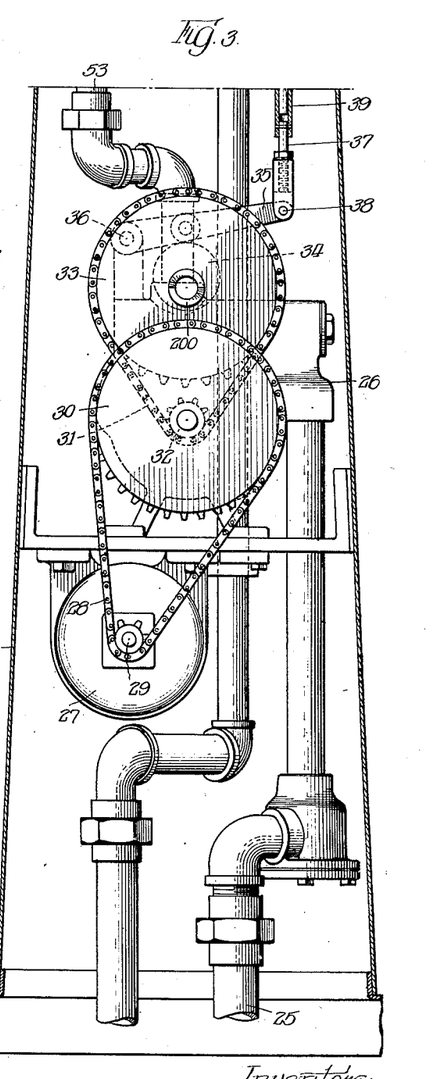
Figure 3 is an enlarged fragmentary vertical sectional elevation of the lower portion of the dispensing apparatus, showing the operating and indicating mechanism, the same corresponding to Figure 1.
Figure 4:
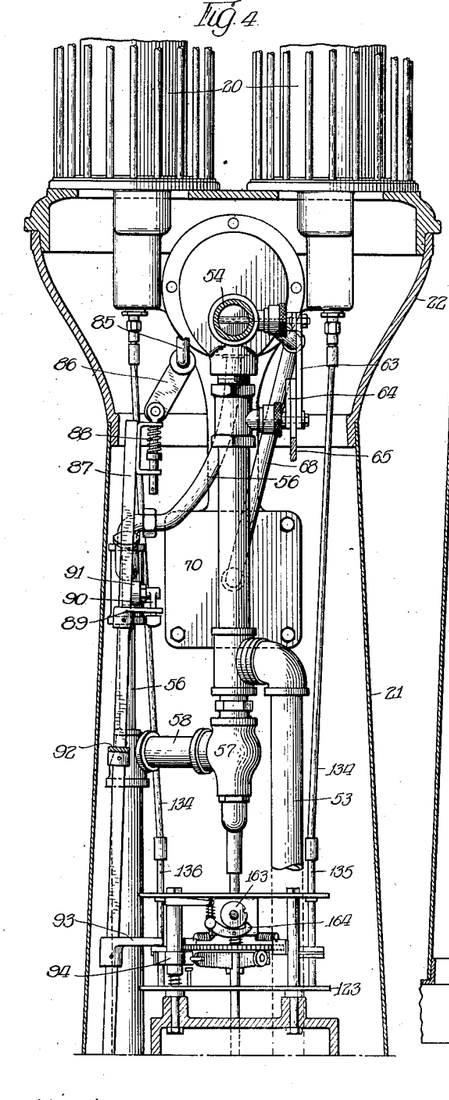
Figure 4 is an enlarged fragmentary vertical sectional elevation of the upper portion of the dispensing apparatus, showing the operating and indicating mechanism, the same being taken substantially at right angles to the view illustrated in Figure 2.
Figure 5:
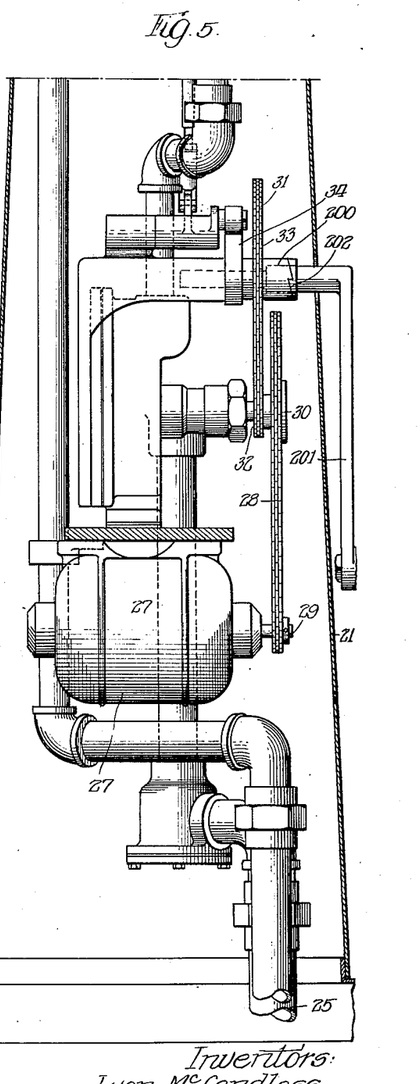
Figure 5 is an enlarged fragmentary vertical sectional elevation of the lower portion of the dispensing apparatus, showing the operating and indicating mechanism, the same being taken substantially at right angles to the view illustrated in Figure 3.

The source of liquid supply (not numbered) is connected through a conduit 25 with a suitable pump 26, shown of the rotary type, the same being either hand actuated, as shown in Figure 5, or motor actuated, as shown in Figure 3, through the motor 27 connected to the pump through the chain and sprocket train 28, 29 and 30, sprocket 30 of the pump in turn being connected to valve operating mechanism through the chain and sprocket train 31, 32 and 33, sprocket 33 being provided with an eccentric or cam 34 adapted to contact and actuate a rocker arm 35 pivoted as at 36 to a fixed pivot and at 38 to a reciprocating rod 37. Said rod is fixed to a sleeve 39, into which is loosely fitted an upwardly extending rod 40, said rod being supported in the sleeve normally spaced from rod 37 by means of a spring 41. The upper end of the rod 40 is provided with a bifurcated head or fitting 42 pivoted to a link 43 in turn pivoted to a crank 44 loosely mounted on the four-way valve pivot shaft 45, said crank carrying a pivotally mounted pawl 46 spring pressed by the spring 47 into engagement with the ratchet 48 fixedly mounted at the valve shaft 45. The valve casing may include a head 49 having a downwardly extending guide portion 50 for the rod 40 and to which the control device to be later described may be secured.

The pump casing 21 may also be provided with a bracket 51 provided with a guide portion for the rod 40, said bracket providing a stop for spring 52, one end of which engages the rod 40, normally tending to urge the rod 40 downwardly with respect to the four-way valve. The four-way valve is connected through the conduit 53 with the pump 26, thereby establishing communication between the source of supply, inlet conduit 25, pump 26, conduit 53, four-way valve 23 and to one chamber 20, depending on the setting of the valve, the valve being so arranged that when one chamber is in connection with the inlet, the other chamber is in connection through the valve with the outlet 54, terminating in any suitable valve, such as the sight valve 55, said valve being particularly described in application Serial No. 206,572, Leo Deutsch, sight valve assembly, filed July 18, 1927, and to which valve the usual hose and nozzle is connected.

A normally closed drain conduit 56 is also provided in communication with the four-way valve casing, said conduit extending downwardly back to the source of supply, and communication is also established between the inlet conduit 53 and the drain conduit 56 through a normally closed pressure sensitive valve 57 and conduit 58. Throttle valves 59 and 60 are provided in the inlet conduit 53 and the outlet conduit 54, preferably adjacent the four-way valve, said valves being provided with operating cranks 61 and 62 connected for substantially simultaneous operation to the link 63. The crank 61 may be of bellcrank shape to be provided with an extension or crank 64 in turn connected through link 65 with the crank 66 controlled on the outside of the casing through member 67. So it will be seen that the flow or pressure of the liquid to the cylinders may be regulated by a single control so that the same amount of liquid will be fed to the filling chamber as is being discharged from the emptying chamber.

A conduit 68 is connected to the valve casing in such a manner that it is always in communication with the filling chamber, the other end of said conduit terminating in a control device 69, preferably secured to the downwardly extending portion 50 of the head 49. Member 69, preferably a pressure actuated device, may be of any convenient construction, such as a pressure sensitive diaphragm construction, indicated in Figures 1 and 2. In this construction, the device 69 includes the liquid chamber 70 in communication with the conduit 68, said chamber being closed by means of the diaphragm 71 of any construction, such as leather covered, with a liquid impervious membrane completing the diaphragm, said diaphragm being secured between the chamber forming member and a piston cylinder or housing 72. The piston 73 normally abuts the diaphragm, being urged in such position by resilient members 74 encircling guiding plungers 75 cooperating with the casing 72. The piston is provided with a piston rod 76 pivotally secured to a latch 77 pivotally mounted as at 78 to the housing 72. Said latch is normally disposed in way of the collar 79 secured to the rod 40 in such position that in latch contacting position the rod 40 may be moved without changing position of the four-way valve; that is, the pawl 46 merely moves relative to the rachet 48 without engaging successive teeth.

Any convenient actuating means may be provided for the apparatus, such as the chain pull 80, the same penetrating the casing, being guided by suitable rollers or other anti-friction members 81 and 82 pivoted to the casing and to an operating rod 83 in such a manner as will give a multiplying effect to the effort applied to said chain, said operating rod being constructed to close contacts starting actuation of the motor. The rod may also be pivotally mounted as at 84 to an opening rod 85 for the sight valve 55. The rod 85 is pivotally mounted through the floating link 86 to a vertically extending rod 87, said link being slidably connected to said rod through a resilient connection 88. Rod 87 is provided with a finger 89 adapted to be depressed with the rod to contact the operating member 90 of a normally closed drain valve 91 disposed in the drain conduit 56. Rod 87 is also provided with a cam or finger 92 adapted to be contacted by the end of the nozzle when said nozzle is inserted in inoperative position in the casing to be locked in night position, contact of said nozzle serving to depress the rod 87. Rod 87 is also provided with a finger 93 adapted to contact and depress the finger 94 provided on the metering device for operating said meter to inoperative position.

Figure 1:
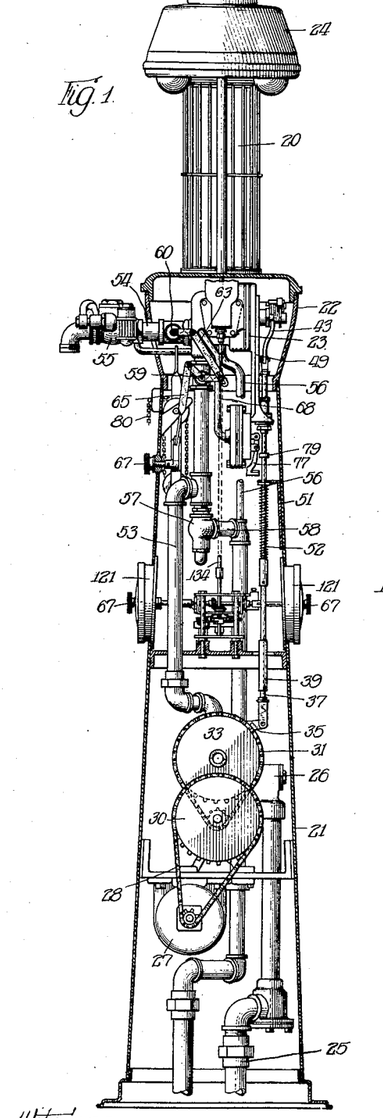
Figure 1 is a vertical sectional elevation of the liquid dispensing apparatus embodying the invention.
Figure 2:
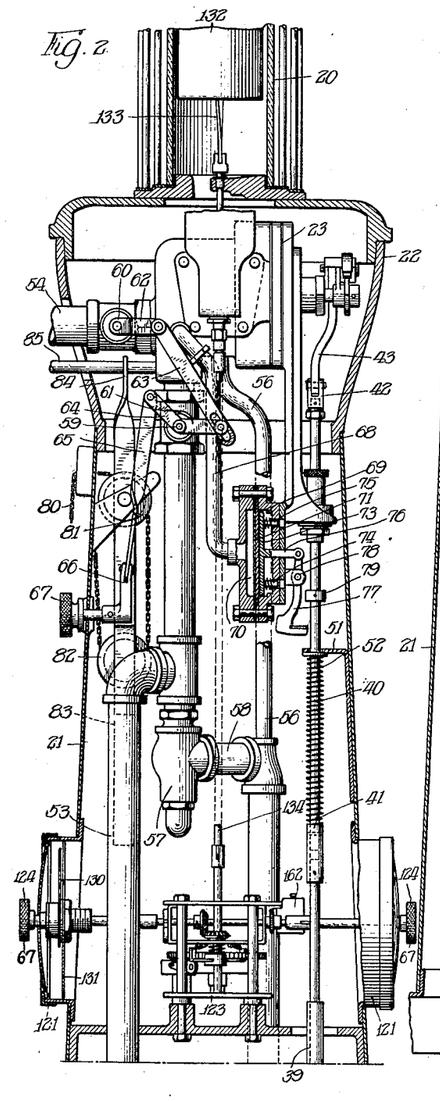
Figure 2 is an enlarged fragmentary vertical sectional elevation of the upper portion of the dispensing apparatus, showing the operating and indicating mechanism, the same corresponding to Figure 1.
Figure 6:
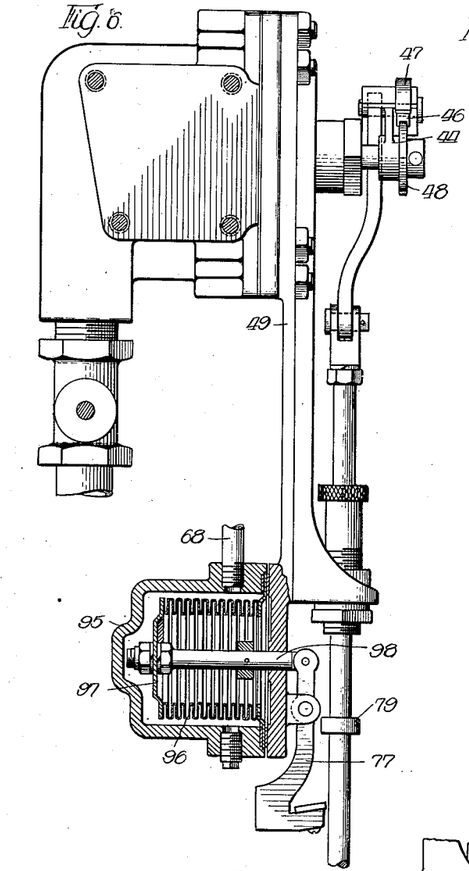
Figure 6 is an enlarged fragmentary sectional side elevation of the four-way valve, showing an associated control valve of a different form than that indicated in Figures 1 to 5.

The control device 69 may be varied somewhat from the device illustrated in Figures 1 and 2 to such a device as illustrated in Figure 6. In this case, pressure conduit 68 is connected to the housing 95, containing preferably a metallic siphon or bellows 96, pressure sensitive and adapted for compression. The bellows is closed by means of a head 97 to which the rod 98 is attached, said rod being pivoted to the latch 77 in a manner as already described.

Another variation of the control device may take the form of a simple piston arrangement. In this case, the pressure conduit 68 is connected to the cylinder 99 containing the piston 100, spring pressed by spring 101 toward the pressure conduit 68, the piston being provided with a piston rod 102 pivotally connected to the latch 77 in a manner as already described. This modification may be further varied for combining the by-pass or relief valve with the piston operating four-way valve trigger mechanism, which is accomplished by the simple addition of a port in the cylinder 99, which port is to be connected to the overflow and is so positioned preferably in the bottom of the cylinder, as to be uncovered by the piston 100 at the limit of its stroke in unlatching operation; that is, in movement toward the right as viewed in Figure 8. This arrangement is preferably only used in case no variable speed control of the device is required.

Figures 9, 10, 11, 12:
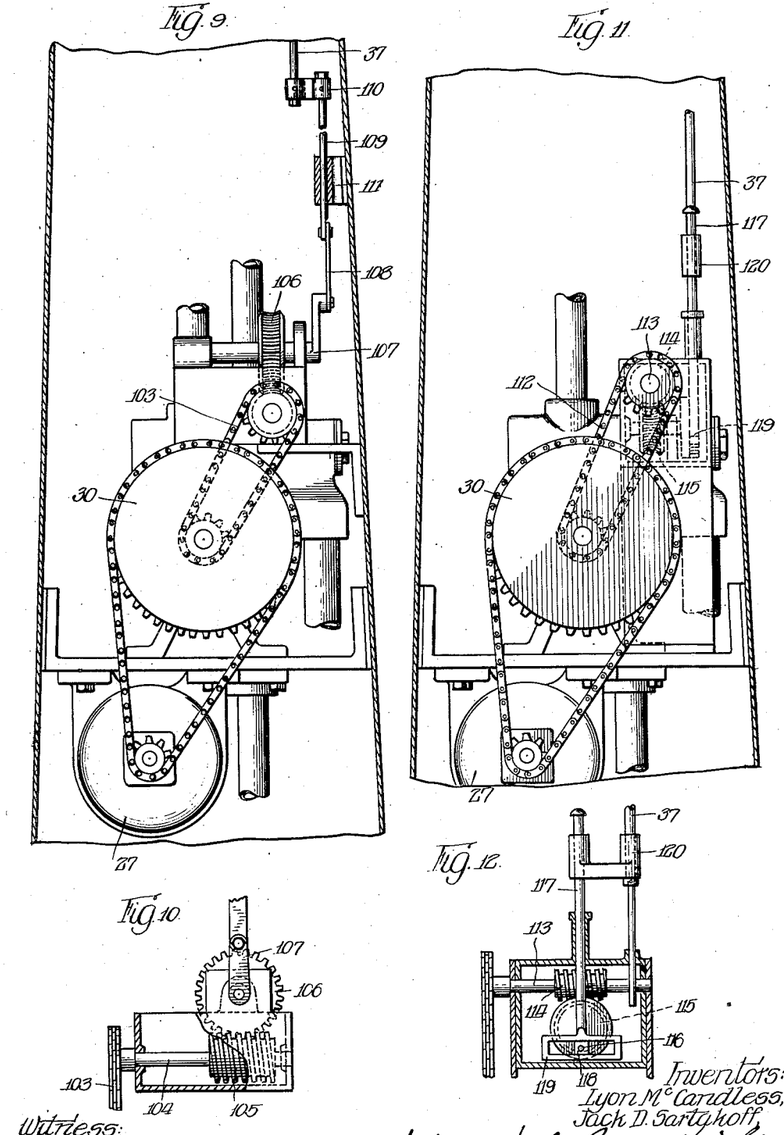
Figure 9 is an enlarged fragmentary vertical sectional elevation through the lower portion of the housing or standard corresponding substantially to that illustrated in Figure 3, showing a modified form of valve operating mechanism.
Figure 10 is an enlarged fragmentary sectional elevation of the valve rod operating mechanism illustrated in Figure 9.
Figure 11 is an enlarged fragmentary vertical sectional elevation through the lower portion of the housing or standard corresponding substantially to that illustrated in Figure 3, showing still another modified form corresponding to Figure 9.
Figure 12 is an enlarged fragmentary sectional elevation of the valve rod operating mechanism illustrated in Figure 11.
Figure 13:
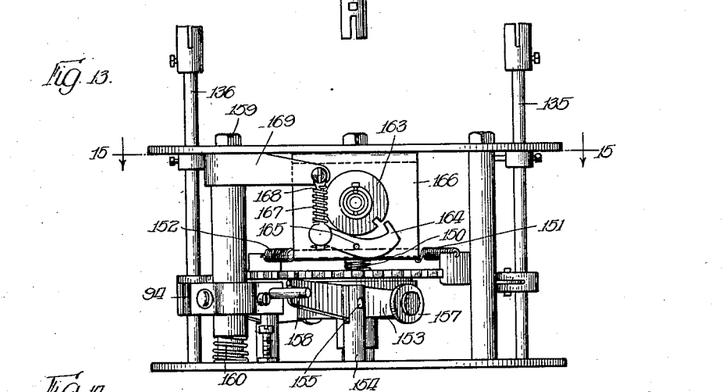
Figure 13 is an enlarged side elevation of the metering device.
Figures 14, 16:
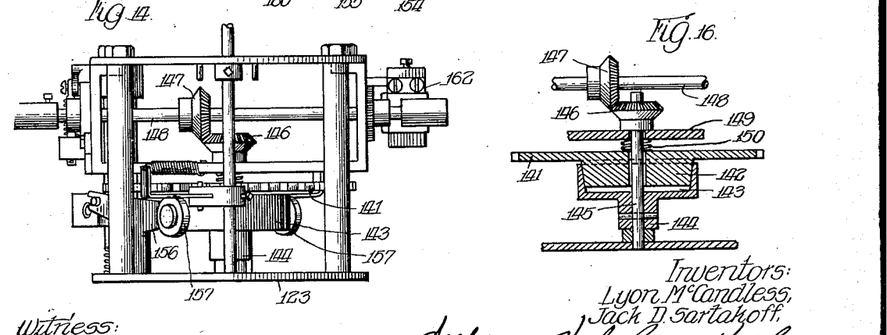
Figure 14 is an enlarged side elevation of the metering device taken substantially at right angles to the view shown in Figure 13.
Figure 16 is an enlarged fragmentary elevation of the clutch mechanism of the metering device.
Figure 15:
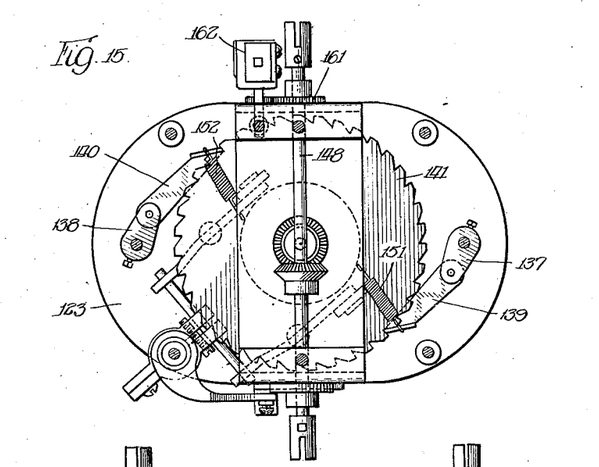
Figure 15 is a top plan view of the metering device illustrated in Figure 13, the same being taken substantially in the plane as indicated by the line 15—15.
Figures 17, 19:
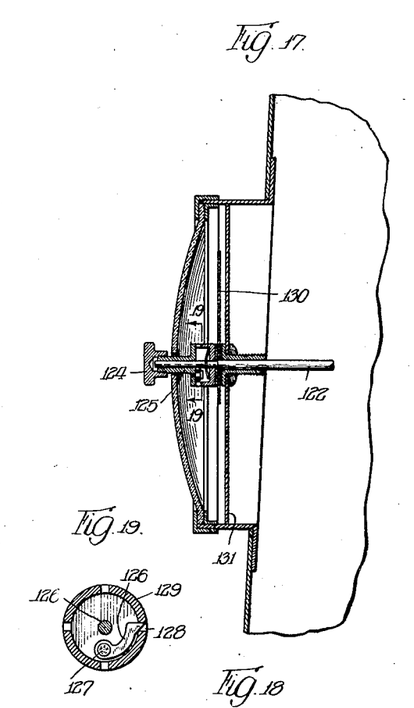
Figure 17 is an enlarged sectional elevation of the quantity indicating means or dial illustrated in Figure 1.
Figure 19 is an enlarged sectional elevation of the ratchet connection between the resetting means and the pointer of the indicating means illustrated in Figures 17 and 18, the same being taken substantially in the plane as indicated by the line 19—19 of Figure 17.
Figure 18:
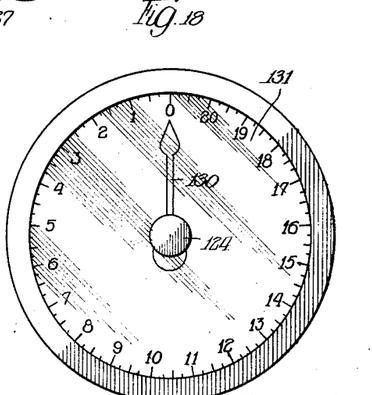
Figure 18 is an enlarged sectional elevation of the quantity indicating means illustrated in Figure 1, the same being taken substantially at right angles to Figure 17.

The motor and pump operating means for the rod 37 may be varied as illustrated in Figures 9 and 10. In this case, the motor 27 operates pump sprocket 30, which is in turn connected through the gearing or chain 103 to the shaft 104, said shaft having a worm 105 meshing with gear 106, said gear serving to rotate the crank 107, said crank being connected through link means 108 and 109 to a cross head 110 connected to the rod 37, any of said links, such as the link 109, being guided if necessary by guide bracket 111.

The motor operation may be further varied as illustrated in Figures 11 and 12, in which the motor 27 drives the pump sprocket 30 in turn connected in any suitable manner, such as through the chain 112 and through suitable sprockets to the shaft 113. Worm 114 on shaft 113 meshes with gear 115, driving the crank 116 in turn imparting movement of reciprocation to the piston rod 117 through the block and link connection 118 and 119, shaft 117 being suitably connected to the rod 37 through cross head 120, which may provide lost motion or not as desired.

At this point it may be well to note that any of the motor and pump operating means (Figures 5, 9 to 12) may be replaced or supplemented by hand operating means, as shown in Figure 5. In this case, the eccentric shaft 200 is provided with a crank 201, normally loosely mounted with respect to said shaft, but a clutch, crown gear or ratchet connection 202 may be provided between said crank and shaft to permit rotation thereof. In such case, the motor 27 may have a clutch connection with the shaft 200 to permit rotation thereof independent of said motor, and further, of course the crank 201 may be replaced by proper oscillating lever connections to shaft 200.

Casing 21 is provided with dials 121 for indicating the amount of liquid dispensed, the operating shaft 122 of said dials being connected to a metering device 123 and to a setting knob 124 disposed on the outside of the dials. The metering device, however, is connected to a member 125 loosely mounted with respect to the shaft 122 and having a pawl 126 pivoted thereto as at 127, said pawl being so arranged as to mesh with suitable apertures 128 provided on a housing or ratchet 129 fixed to the shaft 122, shaft 122 having the pointer 130 fixed thereto cooperating with a suitably calibrated scale 131 for indicating the liquid dispensed.

The metering device may be controlled in any convenient manner such as by means provided in the measuring chambers and adapted to actuate the metering device by emptying the liquid from said measuring chambers. Such actuating means may take the form of the floats 132 cooperating with spiral ribbons 133, the ribbons in turn being connected through suitable stuffing boxes in the bottom of the base member 22 with rods 134, so that downward movement of the floats 132 will rotate the ribbons 133 to impart rotation to the shaft 134, each shaft 134 being connected to one side of the metering device through shafts 135 and 136. Shafts 135 and 136 are each provided with a crank 137 and 138 fixedly mounted thereon and each carrying a pivotally mounted pawl 139 and 140, each pawl meshing with a ratchet wheel 141 provided with a drum 142 forming one element of a friction clutch 143, the other element 144 being fixedly connected to a rotating shaft 145 provided with a beveled gear connection with a shaft 148 through gears 146 and 147, said shaft being in turn connected to shafts 122. A bridge member 149 may be provided, between which member and the ratchet 141 may be disposed a spring 150 normally maintaining the friction clutch elements in operative co-relation. Springs 151 and 152 may be provided between pawls 139 and 140 and the bridge member to maintain said pawls in operative relation with respect to the ratchet 141.

A yoke 153 is pivotally mounted to a fixed member 154 as at 155 beneath the ratchet 141, the bifurcated portions 156 of said yoke being provided with anti-friction members 157 adapted to contact the ratchet 141 to raise the same to render the friction clutch inoperative, it being understood that the arms 156 are disposed on either side of the shaft 145 in order to give proper raising effort to the ratchet 141, preventing binding of the clutch 143. The other end of the yoke is loosely pivotally secured to arm 94 as at 158, said arm 94 being preferably slidably mounted upon one support 159 of the metering device, a spring 160 being provided tending to normally keep said arm in raised position for preventing disengagement of the clutch 143. Shaft 148 is geared as at 161 to a counter 162 for recording the total number of revolutions, and consequently providing means for computing total amounts of liquid dispensed. The other end of said shaft is provided with a notched member 163, the notch being so placed that it may be engaged by a pawl 164 when the pointer 130 has completed one revolution to its zero setting. Pawl 164 is pivotally mounted as at 165 to any supporting member 166 and is spring pressed as at 167 along a loose connection 168 to an arm 169 connected to and movable with arm 94.

In the operation of the counter, it will be seen that when liquid is being introduced into one measuring chamber 20, the float 132 will rise, moving the ribbon 133. Such motion of the ribbon will impart a motion of rotation to say shaft 135 in a counterclockwise direction, moving the pawl along the teeth of the ratchet 141 but causing no movement of said ratchet. Discharge then from the measuring chamber will rotate the shaft 135 in a clockwise direction, moving the pawl 139 to move the ratchet 141 a predetermined amount. While the filled chamber is discharging, the other chamber is filling, causing a counterclockwise motion of the shaft 136 in turn moving the pawl 140 into a position where it may operate the ratchet 141 upon the discharge of said chamber. Movement of the rachet will cause motion of the shaft 145 through the friction clutch 143, shaft 145 imparting a motion of rotation in a counterclockwise direction of shaft 148, and consequently shaft 122, causing movement of the pointer 130, it being desirable to regulate the motion of the ratchet 141 so that the flow of liquid from the emptying chamber may be stopped at any time and fractions of a gallon accordingly read, it being understood that motion of the shaft 148 will of course cause operation of the counter 162.

Referring now to the operation of the apparatus disclosed in Figures 1 to 5 inclusive and 13 to 19 inclusive, it will be seen that it is only necessary after positioning the usual hose attached to the valve 55 at the spot where it is desired to deliver the liquid, to pull the flexible chain 80, such pull imparting an upward movement to the rod 83, such movement serving to close the circuit to the motor for starting said motor and operating the rod 85 to open the valve 55. Starting the motor will of course start the train of gears, actuating the pump and rod and rocker arm 35 and 37, motion of reciprocation being imparted to the rod 37 through the cam or eccentric 34. Reciprocation of the rod 37 will of course cause a like movement of the rod 40, but collar 79 contacting with the latch 77 allows only a limited reciprocatory movement to the rod 40, the movement being so limited that the pawl 46 does not operate the four-way valve through the ratchet 48, as already explained. When liquid has been pumped from the source through conduit 25, pump 26, conduit 53, four-way valve 23, and the measuring chamber 20 to fill the same, such filling will of course move the float 132 to say actuate pawl 139, as already described, until the chamber is filled, at which time the valve in the top thereof will be closed by the incoming liquid, causing a back pressure through the conduit 68, the back pressure operating upon the diaphragm 71, causing outward movement of the piston rod 76, moving the latch out of engagement with the collar 79, permitting the rod 40 to have an additional downward movement so that the pawl 46 will contact the next tooth of the ratchet 48 so that upon upward movement of the rod 37, the four-way valve will be shifted, causing the filled chamber 20 to be put in communication with the outlet conduit 54, valve 55 and the hose connection, and putting the emptied chamber in communication with the source of supply through the connections already named, it being understood as already described, that the discharging operation of the chamber serves to operate the pointer 130. Relief of pressure in conduit 68 through opening communication with empty chamber permits resilient members 74 to return the latch 77 to collar engaging position.

It will be appreciated that even in the short time necessary to shift the four-way valve, a back pressure will be built up in the inlet pipe 53 due to the fact that there is a continued pumping operation. This is taken care of however by bleed valve 57, said valve being operative only after the latch mechanism has operated, in which case liquid will flow through said valve 57 and back to the source of the supply through the overflow 56. When the valve has been shifted, of course, filling operation takes place to the emptied chamber, and discharge operation takes place from the filled chamber, and such is reversed automatically as described.

It will be seen that due to the connection between the resetting mechanism 124 and the shaft 122, that it is not possible to stop the pointer during operation of the apparatus due to the fact that should the member 124 be held in fixed position, the pointer will still continue to move as the pawl will merely slip out of aperture 128 and will continue to so move while the member is held. A release of the chain 80 will cause downward movement of rod 83 and will break the motor circuit, causing the motor to stop, and this movement of rod 83 will also serve to close the valve 55, such movement of course serving to shut off the other mechanism of the pump, preventing any internal operation.

When the hose, however, is to be locked in its position in the casing through any means such as hasps, etc., it will be understood that the nozzle is inserted in its casing aperture, coming in contact with finger 92, depressing rod 87. Depressing this rod 87 will cause operation of the valve 91 through the crank 90, opening communication in the drain conduit 56 between the four-way valve and the measuring chambers and the source of supply, causing any liquid remaining in those parts to drain back to the source. Such depression of the rod 87 will cause the finger 93 to contact finger 94 of the metering device, depressing said finger. Depressing said finger causes the yoke 153 to disengage the friction clutch 143 by engagement between the anti-friction members 157 of the arms 156 and the ratchet 141, raising said ratchet 141 to thereby break the connection, and when this is done, of course any actuation of the shafts 135 and 136 through the floats 132 or otherwise will of course cause movement of the ratchet 141, but no motion will be imparted to the shaft 148; consequently, no motion will be imparted to the counter 162 or pointer 130. When the clutch is disengaged, it is then possible to rotate the pointer 130 through the member 124 and the ratchet connection 126—128, such movement causing rotation of the shaft 122 until the notch in the member 163 is engaged by the pawl 164, at which time pointer 130 will be at the zero marking. Pawl 164 will of course engage the notch in the member 163 due to the fact that depressing the finger 94 depresses finger 169, causing the spring 168 to press the pawl 164 toward the member 163.

Figure 7:
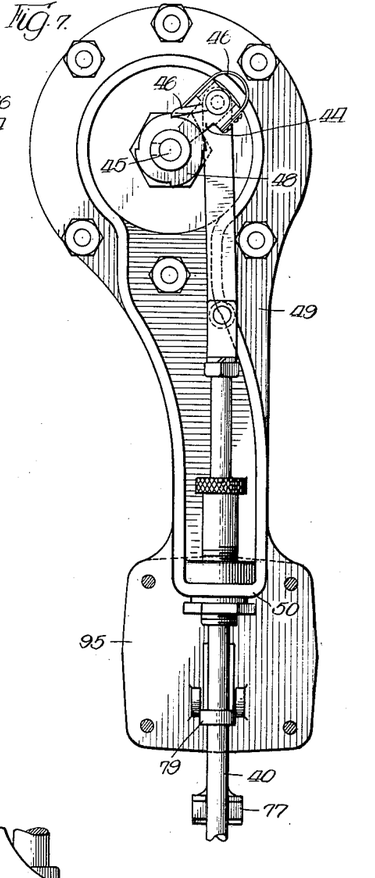
Figure 7 is an enlarged fragmentary front elevation of the four-way valve and associated parts illustrated in Figure 6.

Referring now to Figures 6 and 7, it will be seen that the operation of the latch is substantially the same as already described for the diaphragm, back pressure being introduced to the bellows 96 through conduit 68, causing outward movement of the rod 96 to operate the latch, it being understood that release of the pressure due to shifting of the valve will permit the bellows to return the latch to its normal position.

Figure 8:
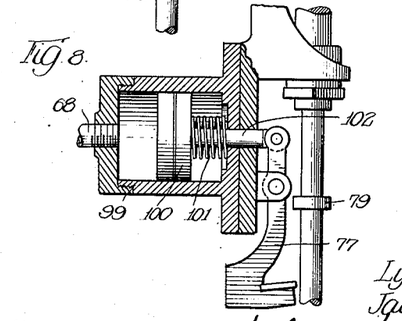
Figure 8 is an enlarged fragmentary sectional elevation of another form of control means for the four-way valve.

Similarly, in Figure 8, pressure introduced through the conduit 68 acts upon the piston 100 to thereby move the latch member 77 to inoperative position, the spring 101 returning the latch 77 to its normal position upon release of the back pressure.

Referring to the operating mechanism illustrated in Figures 9 and 10, it will be seen that motor 27 operates through the operating train to impart rotation to the shaft 104, the worm 105 meshing with the gear 106, causing rotation of the crank 107 which causes reciprocation of the rod 37, similar to the movement imparted through the eccentric and rod and rocker arm.

Similarly, in Figures 11 and 12, the motor operates through the operating train to impart motion of rotation to shaft 113, the worm 114 of said shaft causing rotation of the gear 115 to rotate the crank 116, motion of rotation to the crank imparting reciprocating motion to the rod 117 and consequently rod 37 through the block and link connection 118 and 119.

It is of course understood that in all of the modifications of the parts of the device, the remaining parts are substantially the same as already described, variations of course being permissible within limits, the operation remaining the same. Such variations may take the form of providing the bleed valve 57 as an integral portion of the pump, though such will in no way effect the operation of the apparatus.

With the device shown and described, it will be seen that a very effective as well as positive liquid dispensing apparatus is formed, and it is to be understood that we do not wish to be limited by the exact embodiments of the device shown, which are merely by way of illustration and not limitation, as various and other forms of the device will of course be apparent to those skilled in the art.

We claim:

1. In a liquid dispensing apparatus, the combination of a measuring chamber, means for controlling the flow of liquid to and from said chamber through the bottom thereof, reciprocating means for controlling said first named means, and liquid pressure operated means for preventing operation of said first named means until a predetermined condition prevails.

2. In a liquid dispensing apparatus, the combination of a measuring chamber, means for controlling the flow of liquid to and from said chamber through the bottom thereof, operating means for controlling said first named means, fluid pressure means for preventing operation of said first named means until a predetermined condition prevails, and means for imparting movement to said operating means.

3. In a liquid dispensing apparatus, the combination of measuring chambers, means for supplying liquid thereto, a valve interposed between said measuring chambers and said means for alternately directing liquid to and from said chamber through the bottoms thereof, means including a member the operation of which is normally interrupted, and means for permitting and preventing operation of said member for operating said valve to alternate positions, and means for preventing operation of said valve until a chamber is filled and another chamber is ready to be filled.

4. In a liquid dispensing apparatus, the combination of measuring chambers, discharge means and supply means therefor, a valve between said means and chambers and connected thereto for directing liquid flow to said chambers and discharge means, and control means connected to said supply means and the source of liquid supply permitting actuation of said supply means regardless of the position of the valve, said control means being operable by the back pressure of liquid from the filled chamber.

5. In a liquid dispensing apparatus, the combination of measuring chambers, discharge means and supply means therefor, a valve between said means and chambers and connected thereto for directing liquid flow to said chambers and discharge means, a drain for said chambers and valve to the source of supply, pressure actuated means connecting said drain and supply means for by-passing liquid from said supply means to said drain when said liquid is not supplied to said chambers.

6. In a liquid dispensing apparatus, the combination of measuring chambers, discharge means and supply means therefor, a source of supply and pumping means for pumping liquid through said supply means, a valve between said means and chambers and connected thereto for directing liquid flow, a drain for said chambers and valve to the source of supply, and fluid actuated means connecting said drain and supply means for by-passing liquid from said supply means to said drain when said liquid is not supplied to said chambers.

7. In a liquid dispensing apparatus, the combination of measuring chambers, discharge means and supply means therefor, a valve between said means and chambers and connected thereto for directing liquid flow to said chambers and discharge means, and means associated with said chambers and said discharge and supply means for rendering the flow of liquid to and from said chambers equal.

8. In a liquid dispensing apparatus, the combination of measuring chambers, discharge means and supply means therefor, a valve between said means and chambers and connected thereto for directing liquid flow to said chambers and discharge means, and means in said supply and discharge means for rendering the flow of liquid to and from said chambers equal.

9. In a liquid dispensing apparatus, the combination of measuring chambers, discharge means and supply means therefor, a valve between said means and chambers and connected thereto for directing liquid flow to said chambers and discharge means, throttles in said supply and discharge means for rendering the flow of liquid constant to and from said chambers, and a member associated with said throttles for remote control thereof.

10. In a liquid dispensing apparatus, the combination of measuring chambers, a supply line therefor, a valve in said supply line for directing flow of liquid to and discharge of liquid from alternating chambers through the bottoms thereof, reciprocating means for controlling said valve, a source of liquid supply, means associated with said source and supply line for pumping liquid, means associated with said last named means for imparting motion to said reciprocating means, and liquid controlled means permitting actuation of said valve when one of said chambers is filled.

11. In a liquid dispensing apparatus, the combination of measuring chambers, a supply line therefor, a valve in said supply line for directing simultaneous flow of liquid to and discharge of liquid from alternating chambers, reciprocating means for controlling said valve to reverse the liquid flow to and from said chambers, a source of liquid supply, means associated with said source and supply line for pumping liquid, means associated with said last named means for imparting motion to said reciprocating means, and pressure controlled means permitting actuation of said valve when one of said chambers is filled.

12. In a liquid dispensing apparatus, the combination of measuring chambers, a supply line therefor, a valve in said supply line for directing simultaneous flow of liquid to and discharge of liquid from alternating chambers, reciprocating means for controlling said valve, said reciprocating means having a lost motion device therein, pressure controlled means cooperating with said reciprocating means for limiting movement thereof to prevent actuation of said valve until one chamber has been filled, a source of liquid supply, means associated with said source and supply line for pumping liquid, and means associated with said last named means for imparting motion to said reciprocating means.

Signed at Rochester, Pennsylvania, this 28th day of March, 1928.

LYON McCANDLESS.
JACK D. SARTAKOFF.